June 30, 1959 — J. A. TOMKINS — 2,892,266
CALCULATOR KEYBOARD SIMULATOR FOR TRAINING PURPOSES
Filed April 18, 1958 — 2 Sheets-Sheet 1

INVENTOR.
JOHN A. TOMKINS.
BY
HIS ATTORNEY.

June 30, 1959 — J. A. TOMKINS — 2,892,266
CALCULATOR KEYBOARD SIMULATOR FOR TRAINING PURPOSES
Filed April 18, 1958 — 2 Sheets-Sheet 2
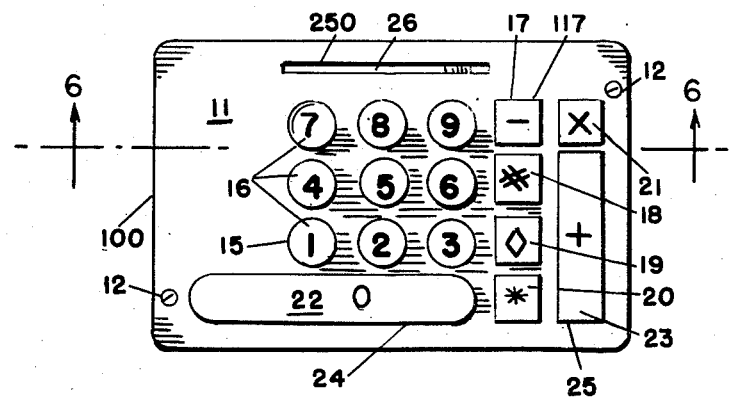
FIG. 5.
FIG. 6.
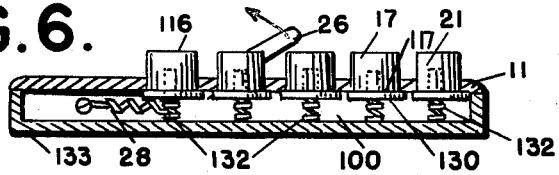
FIG. 8.
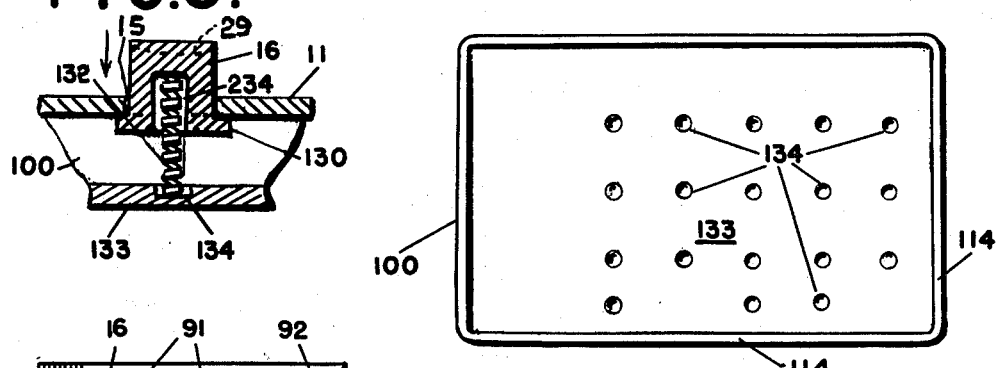
FIG. 7.
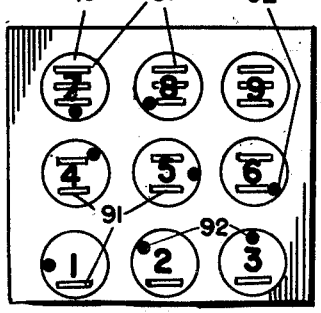
FIG. 9.
INVENTOR.
JOHN A. TOMKINS.
BY
HIS ATTORNEY.

United States Patent Office 2,892,266
Patented June 30, 1959

2,892,266

CALCULATOR KEYBOARD SIMULATOR FOR TRAINING PURPOSES

John A. Tomkins, Catonsville, Md.

Application April 18, 1958, Serial No. 729,407

2 Claims. (Cl. 35—5)

This invention relates to educational equipment and more particularly to devices intended for practice or training purposes in the line of calculating machines.

The present age and civilization tends towards the use of machines, both in the production of a large majority of commercial items and in deriving graphical and mathematical results. In the latter class, which includes this invention, machines are in general use for commercial and engineering purposes. They are commonly termed adding or calculating machines. Their constructions are somewhat like that of a typewriter and the like. Keys are employed and arranged to be pushed down by the fingers of the operator in predetermined sequence. Through resilient levers and gearing, variously interconnected, progressive movements are induced to produce resulting arrangements of figures or products, ready subsequently, to be stamped on a paper. A particular key is operated at the end of the general operations to bring about the stamping and thereby give a visual or written representation of the final product. The movements are more or less complicated but by careful practice, considerable speed and skill in performing the operations can be attained by an operator. However, the machines are relatively expensive and are not intended to be used indiscriminately by unskilled users, since such use tends to substantially reduce the useful life of the machine. To overcome these objections and yet provide for the necessary practice for proficiency, a device has been created under this invention, capable of being operated by a novice, as much as he may desire, without having to worry about the consequences. This is because of the inexpensiveness of the device and the simplicity of its operative construction. In this device, the size and type has the appearance of the keyboard of a conventional calculating machine. The keys are correctly positioned on a suitable box or casket and offer the same resilient resistance to operation as the principal machine that is copied. They have the same amount of travel, and all the key parts visible closely resemble the original elements on the calculator. The difference in the structure is in the lack of levers, gearing, paper roll, and other complicated operating mechanism. Also the heavy under-carriage is omitted. The invented device is light and portable. It can be carried about in the pocket of a coat, brief case, or hand bag. In general, the keyboard simulates the keyboard of an up-to-date commercial calculator.

It is therefore an object of this invention to provide a new and improved calculator keyboard simulator that will provide particular advantages and avoid one or more of the objections inherent in the previous art.

Another object of the invention is to provide a new and improved calculator keyboard simulator that will enable its user to practice freely on it, to attain the same results in fingering skill as could be obtained from an original commercial calculating machine.

A further object of the invention is to provide a new and improved calculator keyboard simulator that will be relatively light, compact, effective as well as economical to manufacture, and incidently, being convenient to use and attractive in appearance.

An additional object of this invention is to provide a new and improved calculator keyboard simulator, so as to provide a susbtitute keyboard for practice work and training in the use of a calculator, during class periods, that will be simple in structure; and free from gearing; and designed to require few occasions for maintenance and repairs. The term, simulator, is used, as a matter of arbitrary convenience, and to distinguish the invention from the items known as replicas, miniatures, duplicates, and the like, which have different functions.

Other objects will become apparent as the invention is more fully set forth.

In the following description, reference will be made to keys, and key units. Although it is not intended, on this application, to apply the rule too strictly, the term: —key, is the upper portion of the body of the whole key unit.

For a better understanding of the invention, its construction and principles of operation, reference is made to the accompanying drawings wherein a particular form of the invention is illustrated by way of example, while the following description outlines its features and the manner in which it is operated.

In the drawings:

Figure 5 is a plan view of a modified form of simulator;

Figure 6 is a sectional elevation of Figure 5 taken on line 6—6 thereof;

Figure 7 is a plan view of the box used in this modification with cover and keys removed; and Figure 8 is an enlarged detail on section showing the construction of a typical key used in this modification, in the box;

Figure 9, shows keys modified.

Similar reference characters refer to similar parts throughout the drawings, including the modification.

Figure 1:
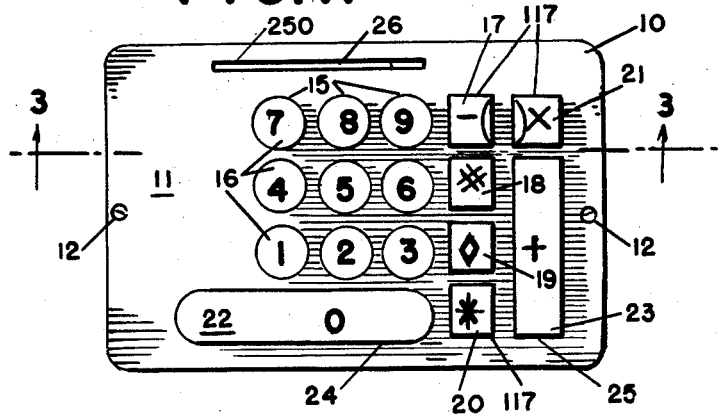
Figure 1 is a plan view of a calculator keyboard simulator embodying this invention.
Figure 2:
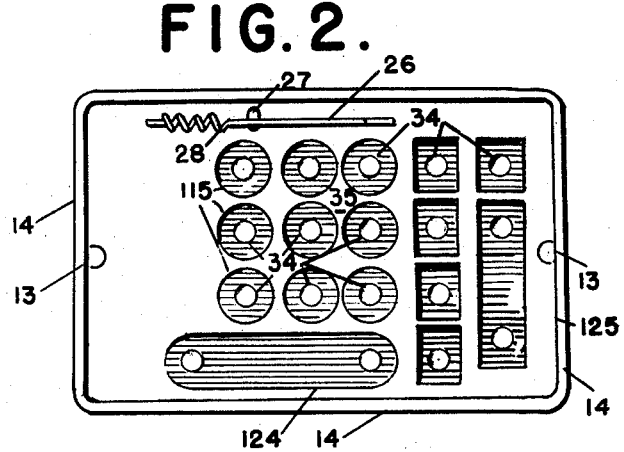
Figure 2 is a plan view of this embodiment with the cover removed.

In the construction of the device, Figures 1, 2, 3, 4, a rectangular box or casket 10 forms the base. It has a cover 11, suitably held in place by screws 12 screwed into lugs 13 on the walls 14. The cover 11 is perforated to provide circular holes 15, for the cylindrical keys 16, which are numbered.

Quasi rectangular openings 117 are provided for the so-called rectangular keys 17, 18, 19, 20, and 21 respectively. These rectangular keys are respectively marked with a minus sign (—); a number sign (#); a diamond ($\Diamond$); an asterisk (\*); and a multiply sign ($\times$). For the elongated keys or bars 22 and 23, used for the zero (0) symbol and the add or +, respectively, the openings 24 and 25 respectively are provided. A long narrow slot 250 at the side of the cover serves as a channel and guide for a lever arm, 26, to swing in, on its pivot pin 27. The pin 27 is attached to the wall adjacent, and journals the lever. A coil spring 28 attached at one end to the box tensions the lever, normally pulling it back to the position shown in Figure 3. The ends of the slot 250 control the amount of travel that the lever arm 26 has.

Figure 4:
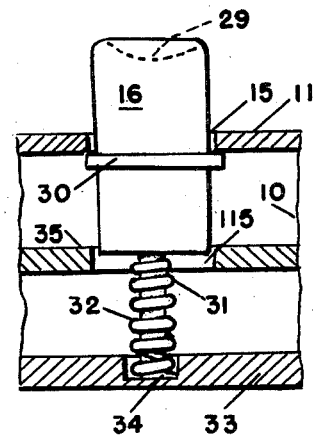
Figure 4 is a side elevation view of a typical key unit used in this embodiment.
Figure 3:
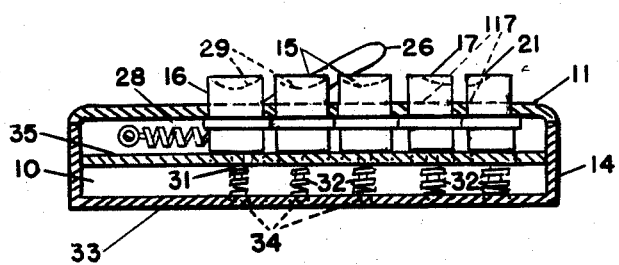
Figure 3 is a side-elevation, in section, taken along the line 3—3 of Figure 1.

The cylindrical key units 16 are preferably formed as indicated in Figures 3 and 4. The upper faces 29 where the indicies, 1. 2. 3. 4. 5. 6. 7. 8. 9.

are impressed on, or slightly concaved to enable the fingers used, to depress in them. This is a characteristic of the original machine that is copied. This original machine is one of a conventional type and character that is used in commercial offices through out the country at the present time. An enlarged rib or integral collar 30 is situated about the middle of each key unit and acts as a means for limiting the travel of the latter during operation. Extending from the bottom of the key is a cylindrical stem 31 of smaller diameter. This stem 31 is surrounded by a coil spring 32 that keeps the key tensioned upwardly when in place.

An inner shelf 35 extends across the box below the cover and is held there in any suitable manner, stationary. It has a series of holes 115, and openings 124 and 125 similar to 15, 24, 25 in the cover through which the keys project and to which they align. They allow the keys to operate therein in a reciprocating manner and guide them in these movements. The bottom 33 of the box has circular recesses 34 deep enough to retain the coil springs 32 upright and encompassed about the stems 31. The key units are so designed and arranged, as to maintain the upper face of their collars 30 resiliently pressed up against the cover normally. When pressed down, the same collars press their lower faces against the shelf 35. The amount of travel of the keys is thus limited to the same amount of travel accorded the keys on the conventional calculating machine that this invention copies. Likewise the lever 26 swings through an arc of similar length to that of the conventional lever, when pulled back by the operator, and rebounds to the original position when released, by reason of the spring 28.

The various keys are operated in the usual manner required by the conventional machine it represents. However, in this particular form, which is an adding machine, this operation is as follows: The numbered keys 16 are punched, struck or pressed in appropriate sequence in accordance with the addition required, and the quantity to be considered. The side lever 26 is pulled to cancel that quantity, in mimic. The next line of figures or numbers is punched similarly in mimic, and so on. If a mistake is made, the lever 26 is swung on its pin, to "clear" the machine, in mimic. The zero bar is struck in its turn, as needed.

All these operations are performed without any written record appearing. Thus the operations are "blind." This however does not affect the effectiveness of the machine for practice. The user realizes his mistakes because he visually checks the positions of his fingers with the keys they depress, at the beginning. Later, after some practice, the relation of the fingers to the keys at work becomes automatic, and mistakes can be appreciated without trouble. The mental attitude and correct finger manipulation is progressively promoted by the device as it is used for practice, until the response is more or less involuntary. The freedom from anxiety which the device provides (because of the elimination of the fear of mistakes, damage and unnecessary wear that practice on the actual expensive conventional adding machine inherent with the use of the latter, induces) is of great personal and physiological value. The user can go at the practice energetically from the beginning or when he wants additional practice in the future to suit his convenience. Concerns and business colleges with adding machines, appreciating their cost, are very willing to have novices use the practice device rather than the originating machine portrayed. It is considered good business to do so. Beginners operating almost any machine are apt to damage it. In their ignorance and mechanical clumsiness, their operations are subject to varieties of actions not intended or expected by the maker, and to the detriment of the machine. The device is very portable, in fact may be carried in the pocket in many instances. It can be used in practice on any table and even on the knee of the user. In production its cost of manufacture can be made very low and therefore made commercially available to all. The parts are so simply arranged that the chances for damage or maintenance expense are small. The springs are so tensioned that the action in depressing the keys feels just the same to the user, as the original machine that is copied, in its keyboard.

The device lends itself to mass usage, especially for school work, where a whole class of students can have their own individual instruments in front of them and work as a team, while the instructor coaches them. Another feature of the device is in the fact that it can be made practically noiseless, so that in practice at the home or while traveling, it may be used without annoyance to others, by reason of noise.

Its construction enables it to be manufactured out of various materials, such as plastic, wood, metal and ceramics, whichever may be preferred. It does not involve ink, loose paper or type, items necessary in the original machine, but undesirable in the simulator, and this without interfering with its main functions and purpose. The main purpose is to create agility in the fingers and mental coordination, desirable in operating a calculating machine.

The terms holes, can be generically applied to the words, openings and slot, since these latter are but special forms of holes, in this application.

In the modified form indicated in Figures 5, 6, 7, 8, there is no inner shelf. The box 100 is of shallow depth. The bottom 133, has the recesses 134, deep enough to hold the springs 128 vertical. The springs 132 tension the keys by being centrally located in hollows 234, inside the latter, as shown in Figure 8. The keys are short and on their lower extremity have collars 130 to limit their upward movement when they strike the cover 11.

When pressed down the keys hit the bottom 133 of the box 100, to stop. The operations and functions are similar to the construction indicated in Figures 1, 2, 3 and 4.

The keys 16, shown in Figure 9, are modified to provide for additional physical identification, in the form of horizontal bars 91, and globular protuberances 92. The latter are arranged 45° part for the different indices and follow the braille pattern. The bars 91 are single for the first vertical column; two bars for the second, and three bars for the third, as indicated. They confirm the touch. The indices are printed on the face of the keys, the bars and protuberances are raised or embossed thereon.

While but one form of the invention is illustrated and described in this application for Letters Patents, it is not intended that the construction of the device should be limited specifically to it, as it is appreciated that other forms would be developed and designed that would use the same principles and come within the scope of the appended claims.

Having thus described the invention what is claimed is:

1. A calculator keyboard simulator comprising, a rectangular box including a bottom wall and a removable cover; said cover having a plurality of holes, openings, and slots therein; a plurality of key units including cylindrical bodies with peripheral collars about the middle portions thereof and stems of restricted diameter extending from the bottom; the upper faces of the individual units being concaved to facilitate finger manipulation; said bodies being disposed in the said holes and reciprocating therein; the said collars limiting the movement thereof when in contact with said cover; a shelf in the box below and spaced from the cover having holes and openings aligned and similar to those in the cover and having the bodies extended to and movable therein; spring means mounted on the said stems and held to the bottom of wall aforesaid; said springs tensioning the said bodies to hold them upwardly in predetermined arrangement and permit their manual depressing until said collars contact the said shelf; lever means including a spring for tensioning it against one end of said slot, but permitting its movement towards the other end thereof under the manual effort of a user of the simulator; said spring being attached to the wall of said box adjacent to the slot and under the cover; the arrangement of the keys and holes and slot being in simulation of a conventional calculating machine keyboard copied herein for the purpose of visually and physically impressing its layout on the user.

2. The same as claim 1, plus the inclusion of: said said spring means being of the helical type arranged with their axes parallel to the axes of said cylindrical bodies and aligned therewith to maintain a direct and linear movement of the key units within their corresponding holes, concealed and in contact with the underside of said bodies.

References Cited in the file of this patent

UNITED STATES PATENTS

| | | |
|---|---|---|
| 1,220,428 | Kinnaman | Mar. 27, 1917 |
| 2,153,231 | Barnard | Apr. 4, 1939 |
| 2,351,324 | Emanuel | June 13, 1944 |
| 2,500,507 | Avery et al. | Mar. 14, 1950 |
| 2,628,030 | Taylor | Feb. 10, 1953 |

FOREIGN PATENTS

| | | |
|---|---|---|
| 748,033 | France | Apr. 10, 1933 |